July 4, 1950

A. P. PAULUS 2,514,254

APPARATUS FOR DIFFUSING EDIBLE SUBSTANCES INTO COMPOSITE MASSES

Filed May 13, 1946

Inventor.
Anthony P. Paulus.
By Harry C. Debute
Attorney.

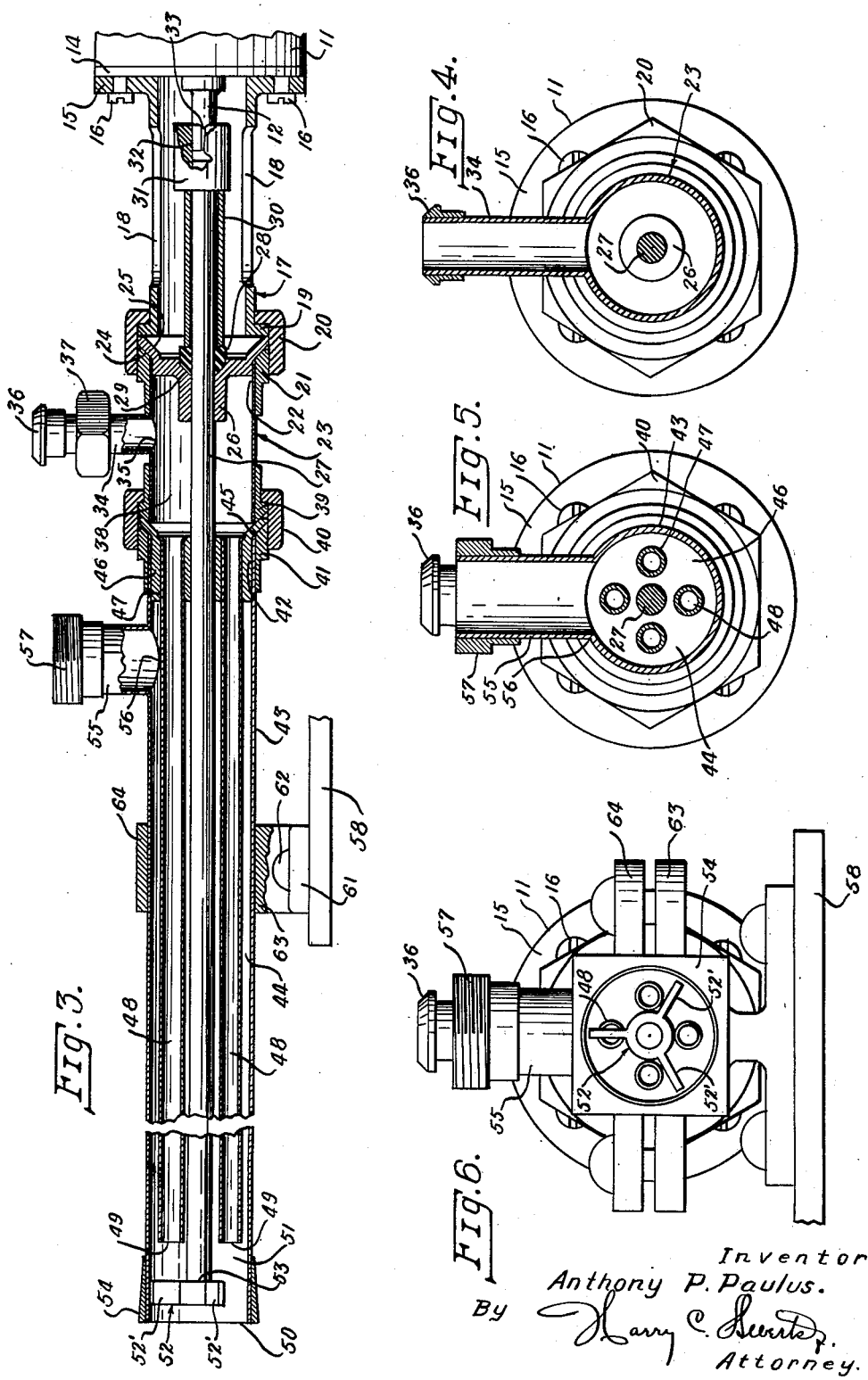

Patented July 4, 1950

2,514,254

UNITED STATES PATENT OFFICE 2,514,254

APPARATUS FOR DIFFUSING EDIBLE SUBSTANCES INTO COMPOSITE MASSES

Anthony P. Paulus, Chicago, Ill., assignor to Walgreen Co., Chicago, Ill., a corporation of Illinois Application May 13, 1946, Serial No. 669,431

3 Claims. (Cl. 259—9)

This invention relates to substance diffusing devices and more particularly to apparatus for diffusing edible substances into composite masses, although certain features thereof may be employed with equal advantages for other purposes.

It contemplates more especially the provision of improved means for simultaneously diffusing substances in order to effect their intermingling to pre-determined extents depending upon the dictates of commercial practice without entailing any appreciable labor, time or skill.

There are innumerable diffusing devices employed in the production of various commodities and substances. These diffusers are not entirely satisfactory for intermingling edible substances such as flavor syrups with normally liquid materials frozen to a substantially solid state such as ice cream in order to procure a composite mass of distinctive appearance and flavor. Up to the present, these substances have been intermingled or diffused by manual stirring methods with results that depended greatly upon the skill and experience of the attendant. This skill and experience varied within a wide range so that a uniform product was difficult to produce and, at best, such did not fulfill the requirements of the trade. With the teachings of the present invention, the human element has been entirely removed from the task of diffusing substances into composite masses which are possessed of the desired appearance and taste characteristics.

One object of the present invention is to simplify the construction and improve the operation of devices of the character mentioned.

Another object is to provide an improved diffusing apparatus that is power operated in any predetermined speed to produce the desired appearance and taste characteristics in the resulting composite mass.

Still another object is to provide a diffusing apparatus embodying means for simultaneously passing different substances in the path of mixing instrumentalities that simultaneously diffuse and proportion the substances to impart a pre-determined uniform composition thereto.

A further object is to provide a simple and effective substance diffusing apparatus wherein various substances are simultaneously displaced and commingled to assume a pre-determined composition to impart thereto the desired appearance and taste characteristics.

A still further object is to provide simple means for passing various substances along pre-determined paths for intermingling into a composite mass responsive to the mechanical mixing thereof at a pre-determined rate to produce the desired appearance and taste characteristics therein.

Still a further object is to provide rotary mixing means in conjunction with separate paths of displacement for different substances to effect the commingling at a pre-determined rate to produce composite masses of controllable appearance and taste characteristics.

Other objects and advantages will appear from the following description of an illustrated embodiment of the present invention.

In the drawings:

Figure 3 is a sectional view in elevation taken substantially along line III—III of Figure 1.

Figure 4 is a sectional plan view taken substantially along line IV—IV of Figure 2.

Figure 5 is a sectional plan view taken substantially along line V—V of Figure 2.

Figure 6 is a bottom plan view of the device shown in Figure 3.

Figure 1:
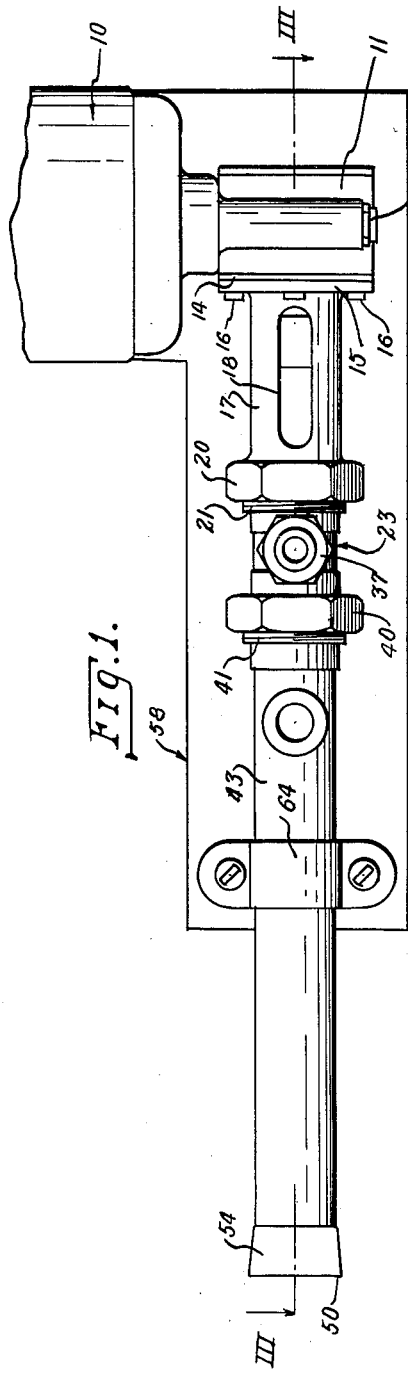
Figure 1 is a front view in elevation of a device embodying the features of the present invention, the electric motor being shown in part.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises an electric motor 10 of any suitable type and capacity which preferably though not essentially is provided with a built-in reduction case housing 11 to reduce the speed of rotation of the motor 10 to substantially 85 R. P. M. for the diffusion of ice cream as it comes from the freezer with a flavor syrup such as chocolate or other flavors utilized to meet the dictates of commercial practice.

Obviously, the R. P. M. of the diffusion apparatus will vary within a wide range depending upon the appearance and taste characteristics desired as well as the temperatures at which the various substances are mixed and, for that matter, their initial characteristics which are factors of their adaptability to diffusion or intermingling. In the case of ice cream at approximately 28 degrees Fahrenheit and flavor syrups at room temperature, the commingling is best suited to the desired appearance and taste characteristics by operating the driven shaft 12 that extends from the reduction gear housing 11, at approximately 85 R. P. M. which is not to be construed as a limitation but merely by way of illustration.

The driven shaft 12 extends downwardly from the gear housing 11 for operative connection with the armature shaft 13 of the motor 10 through the train of gears confined in the gear housing 11. The gear housing 11 is usually provided with an end plate 14 (Figure 3) to which a peripheral flange 15 may be attached by means of threaded screws or other fasteners 16. The peripheral flange 15 extends downwardly in a tubular shaft housing 17 having a plurality of circumferentially spaced and longitudinally extending openings 18, in this instance four, provided therein for permitting the passage of air therethrough and to provide accessibility therein. The tubular shaft housing 17 terminates downwardly in a peripheral flange 19 which has an enlarged nut or other suitable fastener 20 rotatably mounted thereon to threadedly engage a complementary sized and threaded nipple 21. The nipple 21 surrounds and is attached to the open end 22 of a tubular pipe section 23.

As shown, the nipple 21 has a conical seat 24 to receive a correspondingly shaped flange 25 constituting part of an internal axial bearing 26 wherein an elongated axial shaft 27 is journalled. The bearing 26 is held in position between the shaft housing 17 and the pipe section 23 by means of the nut 20 that engages the nipple 21 to maintain the shaft housing flange 19 drawn to the nipple 21 with the bearing flange 25 tightly and rigidly held therebetween. In order to preclude the passage of any liquid entering the pipe section 23 serving as an entrant chamber for the liquid flavor syrup or other substance through the bearing 26 and externally therefrom, a combination rubber-carbon 28 is disposed around the shaft 27 and retained in the conical recess 29 in the bearing 26 around the shaft 27. The bushing seal 28 is held under compression by a sleeve 30 that freely surrounds the shaft 27 above the bearing 26 to support a coupler 31 having a polygonal socket 32 therein.

The coupler 31 is fixed to the upper end of the shaft 27 for total support by the sleeve 30 which engages the bushing seal 28 that is maintained compressed between the shaft 27 and the bearing recess 29 to seal the bearing 26 against passage of any liquid upwardly along the shaft 27. The polygonal socket 32 in the coupler 31 is complemental to the polygonal extremity 33 provided on the free end of the driven shaft 12 that emerges from the reduction gear housing 11 to establish a driving connection with the elongated shaft 27. The pipe section 23 has a tube 34 extending transversely thereof for communication therewith as at 35 to provide for connection with a source of flavor liquid supply through a tapered coupler seat 36 formed on the end of the tube 34. A nut 37 envelopes the tube 34 to engage the flanged head of the tapered seat 36 to establish connection with the complemental end of a pipe line through which the flavor liquid such as chocolate syrup, is supplied to the intake tube 34 that communicates with the pipe section 23 providing a flavor syrup supply chamber 38.

The flavor supply chamber 38 terminates downwardly in a tapered reinforcing seat 39 with which a threaded union nut 40 is associated to engage a threaded nipple 41 fixed to the upper end 42 of an elongated pipe section 43 serving as an ice cream supply chamber 44. To enable the communicating attachment between the flavor supply pipe section 23 and the ice cream supply section 43, a tapered seat 45 is provided inwardly of the entrance orifice 42 of the pipe section 43 as a complement to the correspondingly tapered seat 39 attached to the lower end of the pipe section 23 to establish a sealed connection with the pipe section 43 by resort to the connecting union nut 40.

As shown, the complemental seat 45 depends downwardly in a circular shank 46 which is fitted interiorly of the entrance orifice 42 of the pipe section 43, and is provided with a plurality of circumferentially spaced vertical apertures 47 therein, in this instance four, to receive tightly fitting depending tubes 48 press fitted in each of the apertures 47. The depending tubes 48 communicate with the flavor liquid supply chamber 38, and extend downwardly for substantially the length of the ice cream supply chamber 44 defined by the elongated pipe section 43. The tubes 48 terminate as at 49 within a short distance of the lower free extremity 50 of the pipe section 43 to provide a space 51 wherein a mixing instrumentality such as a radially vaned impeller 52 is disposed for rotation on the lower extremity 53 of the elongated shaft 27.

It should be noted that the elongated shaft 27 terminates short of the discharge end 50 of the pipe section 43 to provide a diffusing chamber 51 wherein the impeller 52 rotates to diffuse and intermingle the substances that simultaneously are displaced downwardly through the tubes 48 and the surrounding chamber 44 of the pipe section 43. The discharge end 50 of the pipe section 43 is preferably reinforced by a tapered ring 54 which may be swaged or otherwise associated therewith as commercial practice may dictate. The substance passing through the chamber 44 of the pipe section 43 is introduced therein through an entrant tube 55 that communicates as at 56 with the pipe section 43 for supply of the ice cream to the upper portion of the chamber 44 just beneath the tube mounting shank 46 therein. The intake ice cream tube 55 has a threaded nipple 57 provided on the extremity thereof to afford attachment of a supply line thereto from an ice cream freezer. This delivers the plastic substance such as ice cream at substantially 28 degrees Fahrenheit while the flavor liquid is supplied under pressure from another source through the tubes 48 to emerge simultaneously in the diffusion chamber 51 of the pipe section 43.

The vanes 52' of the rotating impeller 52 diffuse the flavor liquid through the plastic ice cream mass to the desired extent and imparts a predetermined appearance and taste characteristic thereto depending upon the speed of rotation of the impeller 52 and the relative volume and/or velocity of displacement of the flavor liquid and plastic mass through the tubes 48 and the elongated chamber 44, respectively. The ice cream or other plastic mass flows under the pressure of the freezer discharge instrumentalities, around the flavor syrup supply tubes 48 to intermingle in the diffusion chamber 51. The rate and volume of flow of these two or other substances as well as the speed of rotation of the impeller 52 may be selectively controlled to produce the desired extent of diffusion and flavor effect. In the case of ice cream, the composite discharge from the diffusion chamber 51 is directed into containers of predetermined or selected sizes for filling and subsequent placement in a refrigerated hardening room for further processing and distribution to meet the consumer demand.

Figure 2:
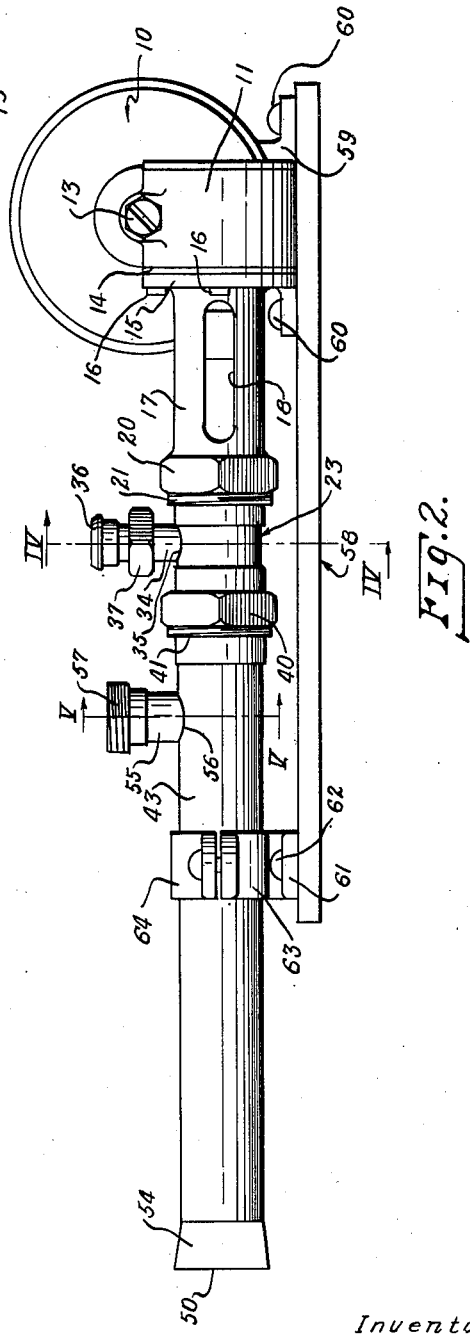
Figure 2 is a side view in elevation of the device shown in Figure 1.

The elongated pipe section 43 is rigidly mounted relative to the motor 10 by means of a plate 58 (Figure 1), in this instance L-shaped, which is attached at one end to the base 59 of the motor 10 by means of suitable fasteners 60 (Figure 2). The other or lower end of the plate 58 is attached to a clamp bracket 61 by means of suitable fasteners 62. The clamp bracket 61 has confronting clamping arms 63—64 which envelop the elongated pipe section 43 to effect the tight embrace thereof to rigidly mount the motor 10 in relation to the elongated pipe section 43 to minimize vibration and maintain the parts in their initial aligned relation.

The motor 10 and the other instrumentalities depending therefrom are mounted in the desired position by attachment of the bracket 58 to any suitable type of suspending support fixture which may be provided for that purpose. Either a floor or ceiling supporting fixture may be provided for attachment to the bracket plate 58 to effect the support thereof adjacent an ice cream freezer. The supply pipes from the ice cream freezer and a flavor liquid supply source may be connected thereto through the medium of the intake tubes 34—55 having the coupling expedients 36—57 provided for that purpose. With this arrangement, it will be apparent that a simple and effective apparatus has been provided to diffuse substances during their simultaneous passage for processing into a composite mass of any pre-determined appearance and taste characteristic.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a device of the character described, the combination with a driven shaft, of a tubular housing surrounding said driven shaft, said housing being closed at one end and open at the other end thereof, said shaft extending through the closed end of said housing and terminating proximate to the open end thereof, plural means for introducing substances into said housing proximate to the closed end thereof, separate chambers in said housing for communicating with said plural substance introducing means, plural tubes surrounding said driven shaft in said housing for communication with one of said separate chambers in said housing, and diffusing means on the terminus of said driven shaft in said housing proximate to the open end thereof.

2. In a device of the character described, the combination with a driven shaft, of a tubular housing surrounding said driven shaft, said housing being closed at one end and open at the other end thereof, said shaft extending through the closed end of said housing and terminating proximate to the open end thereof, plural means for introducing substances into said housing proximate to the closed end thereof, separate chambers in said housing for communicating with said plural substance introducing means, plural tubes surrounding said driven shaft in said housing for communication with one of said separate chambers in said housing, the other of said separate chambers communicating with said housing around said plural tubes for the passage of substances within said housing and around said plural tubes, and diffusing means on the terminus of said driven shaft in said housing proximate to the open end thereof.

3. In a device of the character described, the combination with a driven shaft, of a tubular housing surrounding said driven shaft, said housing being closed at one end and open at the other end thereof, said shaft extending through the closed end of said housing and terminating proximate to the open end thereof, plural means for introducing different substances into said housing proximate to the closed end thereof, separate chambers in said housing for communicating with each of said plural substance introducing means, plural tubes surrounding said driven shaft in said housing for communication with one of said separate chambers in said housing, the other of said separate chambers communicating with said housing around said plural tubes for the passage of substances within said housing and around said plural tubes, diffusing means on the terminus of said driven shaft in said housing proximate to the open end thereof, and power means operatively connected to said driven shaft for rotating said diffusing means simultaneous with the passage of substances through said housing.

ANTHONY P. PAULUS.

REFERENCES CITED

The following references are of record in the file of this patent:

UNITED STATES PATENTS

| Number | Name | Date |
| --- | --- | --- |
| 1,626,487 | Warren | Apr. 26, 1927 |
| 1,788,345 | Skirvin | Jan. 6, 1931 |
| 2,000,953 | Hooker et al. | May 14, 1935 |
| 2,074,673 | Sackett | Mar. 23, 1937 |
| 2,314,421 | Peterson | Mar. 23, 1943 |